United States Patent
Rusan et al.

(10) Patent No.: US 7,750,606 B2
(45) Date of Patent: Jul. 6, 2010

(54) METHOD OF CHARGING AND DISCHARGING OF SUPERCAPACITORS WITHOUT THE USE OF CONVERTERS OR CHARGERS

(75) Inventors: Ileana Rusan, Toronto (CA); David Lazarovich, Thornhill (CA); Subodh Keshri, Bangalore (IN); Srinivasa R. Dangeti, Razole (IN); Hassan Ali Kojori, Mississauga (CA); Ivan Vuk, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 11/867,253

(22) Filed: Oct. 4, 2007

(65) Prior Publication Data
US 2009/0091302 A1    Apr. 9, 2009

(51) Int. Cl.
H02J 7/00 (2006.01)
H02J 1/10 (2006.01)
H02J 3/32 (2006.01)
H02J 3/34 (2006.01)
H02J 7/34 (2006.01)
H02M 1/00 (2007.01)

(52) U.S. Cl. .......................... 320/167; 307/44; 307/48; 363/49

(58) Field of Classification Search .................. 320/166, 320/167
See application file for complete search history.

(56) References Cited

U.S. PATENT DOCUMENTS

| | | | | |
|---|---|---|---|---|
| 3,654,537 | A | * 4/1972 | Coffey | 320/166 |
| 5,461,297 | A | * 10/1995 | Crawford | 320/166 |
| 5,914,542 | A | 6/1999 | Weimer et al. | |
| 6,650,091 | B1 | * 11/2003 | Shiue et al. | 320/166 |
| 2006/0103358 | A1 | 5/2006 | Schulte et al. | |
| 2008/0067872 | A1 | * 3/2008 | Moth | 307/66 |

FOREIGN PATENT DOCUMENTS

WO    WO 02087051    10/2002

* cited by examiner

*Primary Examiner*—Edward Tso
*Assistant Examiner*—Ahmed Omar
(74) *Attorney, Agent, or Firm*—Oral Caglar, Esq.

(57) ABSTRACT

An electrical power system may be provided with temporary power from a bank of supercapacitors connected to a bus of the power system. The supercapacitors may be charged from an output from a primary power source of the system during start-up of the power source. Output voltage of the primary power source may progressively increase and capacitor charging may occur at this progressively increasing voltage. Dedicated current-limiting devices are not required during charging. When temporary power is required the supercapacitors may be discharged sequentially in a series combination so that a high internal voltage of each capacitor is maintained and so that virtually all of the stored energy of the capacitor may be discharged to the bus at a usable voltage.

16 Claims, 9 Drawing Sheets

CAPACITOR BANK PARALLEL CONFIGURATION : (30 = OPEN, 32 = CLOSED, 34 = CLOSED)
CAPACITOR BANK SERIES CONFIGURATION : (30 = CLOSED, 32 = OPEN, 34 = OPEN)

METHOD OF CHARGING AND DISCHARGING OF SUPERCAPACITORS WITHOUT THE USE OF CONVERTERS OR CHARGERS

BACKGROUND OF THE INVENTION

The present invention is in the field of electrical power distribution and, more particularly, electrical energy storage systems that may provide temporary power to an electrical power distribution system of the vehicle or an industrial installation.

In many types of vehicles, electrical power is generated on board the vehicle and distributed to various electrical loads through a power distribution bus. In some vehicles, such as aircraft or other aerospace vehicles, power distribution systems are provided with a source of back-up electrical energy which may be used to maintain power on the bus in the event of loss of the main power sources or in the event of temporary overloading of the bus.

One type of back-up system employs so-called supercapacitors which may be charged and which may be connected to the bus as needed to function temporarily as a source of electrical energy to maintain a desired bus voltage.

In prior-art applications of supercapacitors, charging of the supercapacitors may require complex charging and conversion circuitry. This is because, in a discharged state, internal impedance of the supercapacitor may be as low as a fraction of a milliohm. Therefore, upon initial charging of the supercapacitor, a very large charging current may develop if charging is performed at the bus voltage. In order to limit charging current to acceptable levels, dedicated current-limiting chargers or other current-limiting devices may be employed. Dedicated current-limiting chargers or other current-limiting devices typically must absorb and dissipate a sizeable amount of heat. In this regard, the current-limiting devices must be relatively large. Their use on a vehicle such as an aerospace vehicle may add undesirable weight and cost to the vehicle.

Conversely, when the supercapacitor is discharged onto a bus to provide temporary power, provision must be made to maintain a discharge voltage at a useable voltage. Unlike classic batteries that cede their entire stored energy on a flat characteristic, the discharge characteristic of the supercapacitor is exponential, the supercapacitor being fully discharged only when a terminal voltage of 0 volts (V) is reached. For example a 30 V nickel-cadmium battery connected to an 18 V bus may discharge all of its energy at or above the 18 V needed to maintain the bus voltage. When a supercapacitor is discharged to the 18 V bus, much of its stored energy will remain in the supercapacitor unless its internal voltage is boosted during the discharge process. In the prior art, this process of boosting requires the use of dedicated hardware such as complex converters. Again, as in the case of charging, use of such dedicated hardware may increase weight and cost of a vehicle.

As can be seen, there is a need to provide an improved supercapacitor-based temporary power source for a power distribution system. In particular, there is a need to provide such a temporary power source which can be operated without dedicated charging hardware. Additionally there is a need to provide such a temporary power source which can be operated without dedicated voltage boosting hardware.

SUMMARY OF THE INVENTION

In one aspect of the present invention, a method for storing temporary power for a power distribution system comprises the steps of progressively increasing an output voltage of a power source prior to connecting the power source to a bus of the system, and progressively charging a supercapacitor with current from the power source at the increasing voltage.

In another aspect of the present invention, a method providing temporary power to a power distribution bus comprises the steps of maintaining a plurality of supercapacitor sub-banks of a supercapacitor bank connected to a bus in a parallel configuration, developing a need for temporary power on the bus. discharging the supercapacitor bank onto the bus, and connecting supercapacitor at least one of the sub-banks to one another one of the sub-banks in series when a output discharge voltage of supercapacitor diminishes to a predetermined voltage, whereby a voltage of the at least two sub-banks is combined and the bus voltage is boosted to a voltage that equals or exceeds the predetermined voltage.

In still another aspect of the present invention, an apparatus for supplying electrical power to electrical loads on an aerospace vehicle comprises a primary power source and a control unit that controls a progressive increase of voltage output from the primary power source during start-up of the primary power source. The control unit connects the primary power source to the bus after a desired bus voltage is reached. The supercapacitor bank is connected to the output of the primary power source while the output voltage is increasing. The supercapacitor receives charging current from the output at the progressively increasing voltage whereby the supercapacitor is progressively charged without a dedicated charge-current-limiting device.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for providing temporary power to a power distribution bus. More particularly, the present invention may provide such temporary power with supercapacitors without a need for dedicated hardware for charging and/or discharging the supercapacitors. The present invention may be particularly useful in vehicles such as aircraft in which elimination of such dedicated hardware may contribute to a reduction of weight and cost of the vehicle.

In contrast to prior-art supercapacitor systems, among other things, the present invention may embody a system in which charging of the supercapacitors may be performed during start-up of a primary power source for the power distribution bus. Instead of employing a prior art method of charging the supercapacitor through a dedicated charging unit that is powered at a bus voltage, the present invention may perform supercapacitor charging by extracting lower voltage power from a primary power source, such as a generator, during a progressive voltage increase that develops during its startup. Additionally, the present invention may provide voltage boosting during discharge of the supercapacitor without use of prior-art voltage boosting hardware. Unlike the prior art, the present invention provides for progressive and sequential interconnection of multiple supercapacitors to boost discharge voltage.

Figure 1A:
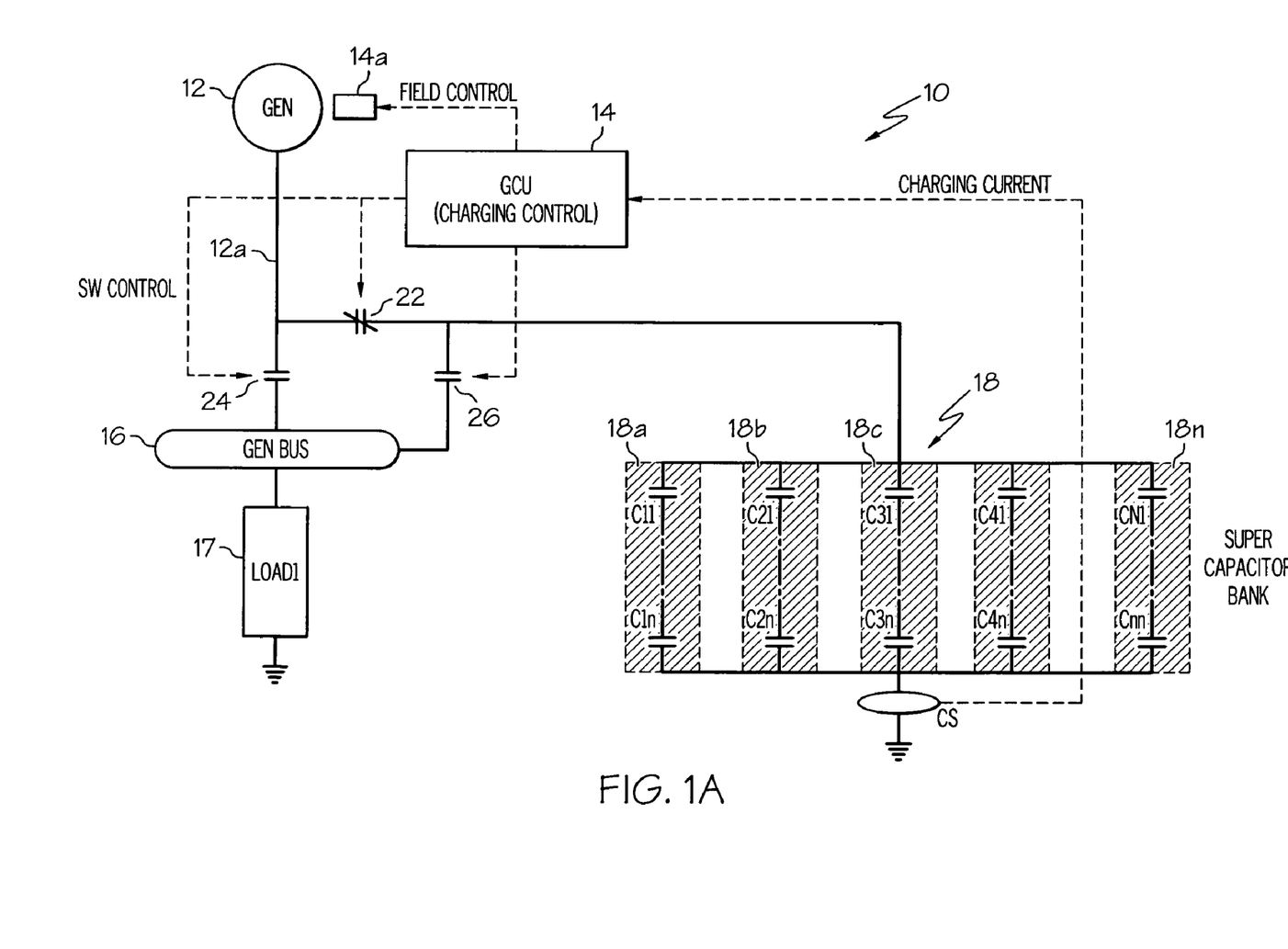
FIG. 1A is a block diagram of an electrical power system in accordance with the invention.

Referring now to FIG. 1A, a block diagram illustrates a power distribution system designated generally by the numeral 10. The power distribution system 10 may comprise a steady-state or primary power source, such as a generator 12, a generator control unit (GCU) 14, a power distribution bus 16 connected to an electrical load 17 and a temporary power source, such as a supercapacitor bank 18.

In steady-state operation the generator 12 may provide electrical power at a desired voltage, the bus voltage, to the bus 16. Output voltage of the generator 12 may be maintained at the bus voltage by the GCU 14. In the steady state, the supercapacitor bank 18 may remain charged at the bus voltage.

An understanding of two non-steady state operating conditions of the system 10 may be relevant to an understanding of the present invention. A first non-steady state may be considered a supercapacitor-charging state and the second may be considered a supercapacitor-discharging state.

The supercapacitor-charging state of the system 10 may be considered a "start-up" state. During start-up, the generator 12 may produce an increasing output voltage as an increasing amount of field current may be applied to the generator 12 through a field control unit 14a of the GCU 14. The GCU 14 may be interconnected to operate a charging switch 22, a main contactor 24 and a load contactor 26. During start-up, the charging switch 22 may interconnect the supercapacitor bank 18 with an output 12a of the generator 12. The supercapacitor bank 18 may be comprised of a plurality of sub-banks 18a, 18b . . . 18n which may be electrically separable from each other. Or alternatively, the supercapacitor bank 18 may be comprised of electrically separable individual capacitors. Or alternatively the supercapacitor bank 18 may be comprised of a plurality of sub-banks 18a-18n. Each of the sub-banks 18a-18n may comprise a plurality of supercapacitors ($C_{11}$-$C_{nn}$) which are connected in series within their respective sub-bank. The sub-banks 18a-18n may be electrically separable from each other.

During start-up, both the generator 12 and the supercapacitor bank 18 may be disconnected from the bus 16, i.e., the main contactor 24 and the supercapacitor connection switch 26 may be open. The supercapacitor bank 18 may receive charging current from the generator output 12a at a voltage that corresponds to progressively increasing start-up voltage of the generator 12. During charging, the sub-banks 18a-18n may be connected to each other in parallel. At initiation of start-up the generator output voltage may be zero. As the applied field current increases, the generator output voltage may progressively increase. During this progressive increase in voltage there may be a corresponding progressive increase in the charge of the supercapacitor bank 18. As the charge of the supercapacitor bank 18 increases, its internal resistance may increase correspondingly. Because of this progressive increase of internal resistance, the supercapacitor bank 18 may be able to receive charging current at an increasingly higher voltage without producing an inordinate current flow from the generator output 12a. Thus, charging of the supercapacitor bank 18 may be made in manner which may be considered current-self-limiting.

It should be noted that the above described charging of the supercapacitor bank 18 is described in the context of a voltage build-up in the generator 12. There are other primary power sources that may be employed to provide such charging. For example the power distribution system 10 may be supplied with primary power from a regulated transformer rectifier unit (not shown). Such a unit may produce progressively increasing voltage before being connected to a bus.

Figure 1B:
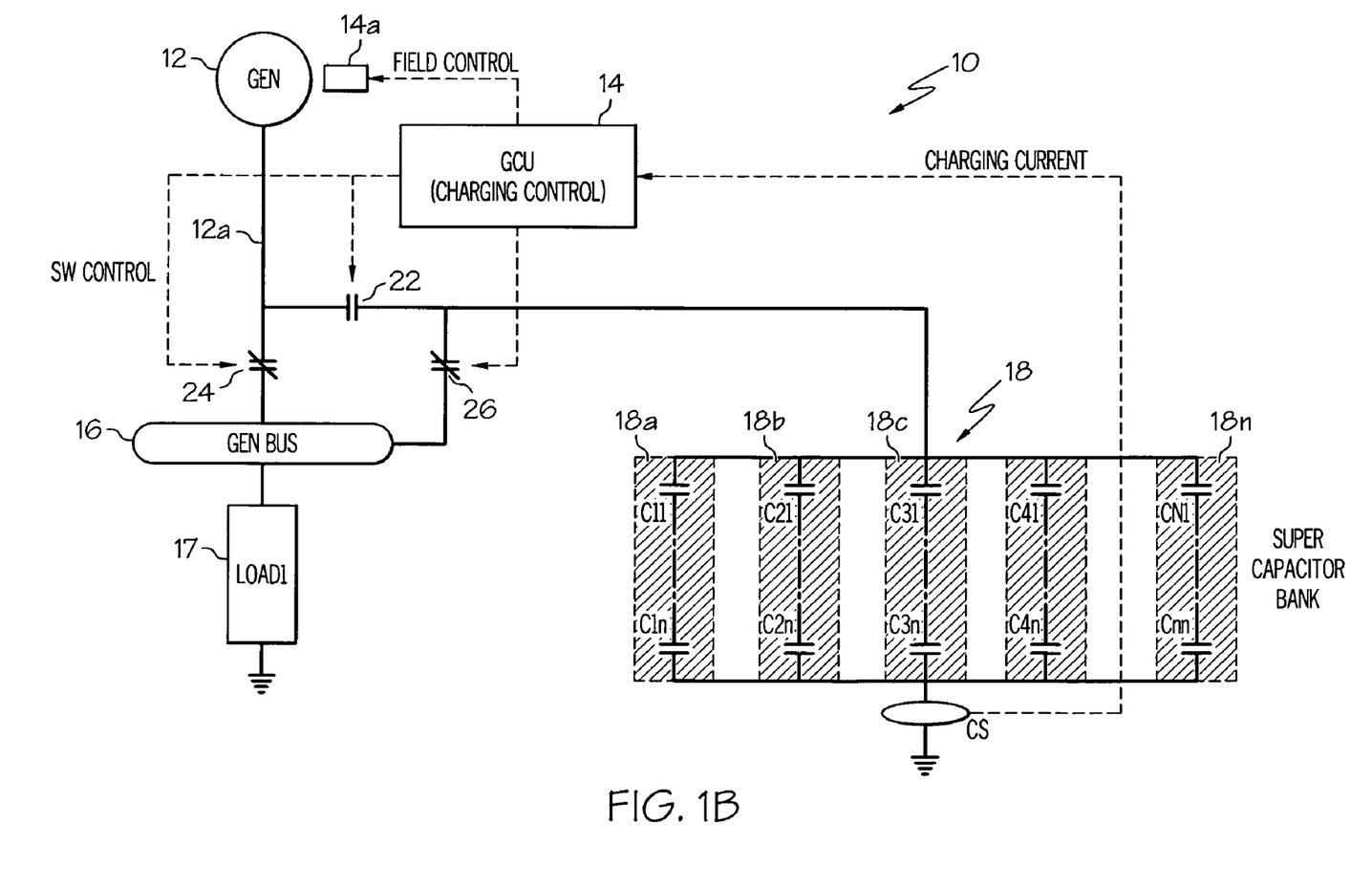
FIG. 1B is a block diagram of the electrical power system of FIG. 1A in accordance with the invention.

Referring now to FIG. 1B, it may be seen that when the generator 12 reaches its full output voltage, i.e. the bus voltage, the GCU 14 may close the main contactor 24 to connect the generator 12 to the bus. At the same time the charging switch 22 may be opened and the supercapacitor connection switch 26 may be closed. This may result in the supercapacitor bank 18 being disconnected from the generator output 12a and being connected to the bus 16. At this point, the power distribution system 10 may be considered to be in steady-state operation. A charge, at the bus voltage, may be maintained in the supercapacitor bank 18 during the steady-state operation of the power system 10. The sub-banks 18a-18n may remain connected in parallel in this steady-state mode of operation of the power system 10.

A second non-steady-state of operation of the power distribution system 10 may be considered a supercapacitor-discharging state. In this discharging mode of operation, the supercapacitor bank 18 may supply power to the bus 16. This discharging condition may arise in various circumstances, such as temporary loss of power from the generator 12 or a temporary overloading of the bus 16 beyond a current capacity of the generator 12. In such circumstances, current in the bus 16 may flow at a voltage lower than the desired bus voltage. In that case, the supercapacitor bank 18 may provide electrical power to the bus 16 to increase voltage in the bus 16.

Figure 2:
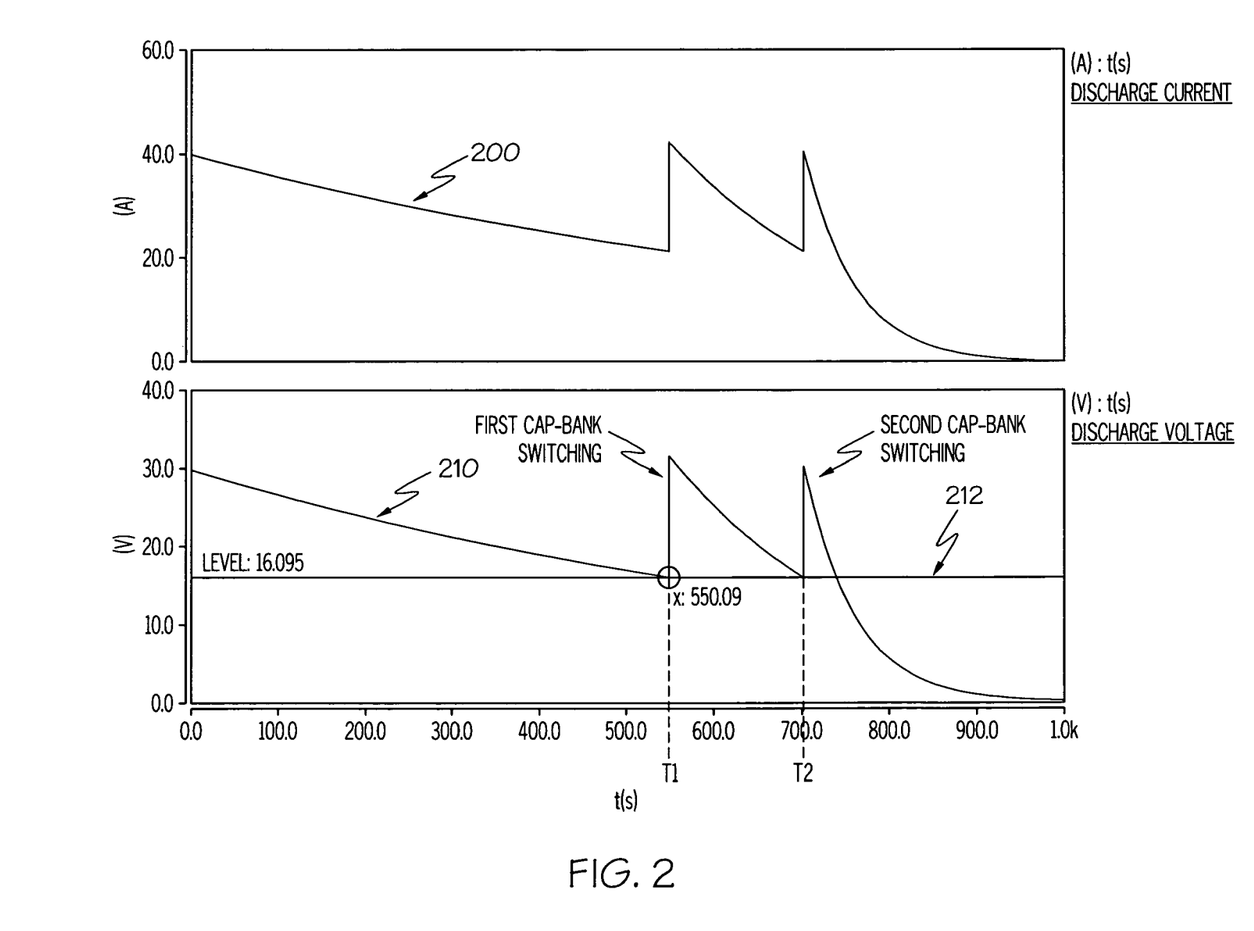
FIG. 2 is a graphical representation of time versus current and voltage relationships in accordance with the invention.

Referring now the FIG. 2 a graph 200 illustrates an exemplary relationship between time and current from a typical supercapacitor bank 18 during discharge. A graph 210 illustrates a relationship between voltage and time that corresponds to the exemplary relationship illustrated by graph 200.

A horizontal line 212 may represent a minimum usable voltage level at which voltage boost is required to the bus 16. This predetermined voltage may be referred to as a minimum discharge voltage. In an exemplary one of the power distribution systems 10, the bus voltage may vary between 30 V-maximum and 16V-minimum. From the graph 210, it may be seen that upon initiation of discharge, stored energy may be released from the parallel supercapacitor bank 18 at a voltage of about 30 volts. The graph 200 and 210 illustrate that the voltage of current flow from the supercapacitor bank 18 may diminish to the voltage level 212 within a period of T1. At time T1 a substantial amount of stored energy may remain in the supercapacitor bank 18. The graph 210 shows that, if at time T1, internal voltage of the supercapacitor bank 18 may be boosted and some of this remaining stored energy may be driven onto the bus 16 at or above the usable voltage.

Voltage boosting may be achieved by switching one or more of the sub-banks 18a-18n from a parallel configuration to a series configuration. Such voltage-boost switching may be performed in the manner described hereinbelow with respect to FIGS. 3A-3C and FIG. 4.

A voltage boost may drive the output voltage of the supercapacitor bank 18 to 30 volts. At a time T2, a second voltage boost may be applied to once again drive the output voltage to about 30 volts. With a successive series of voltage boosts, voltage output from the supercapacitor bank 18 may be maintained at or above the voltage 212 for an extended time period. Consequently, virtually all of the energy stored in the supercapacitor bank 18 may be delivered to the bus 16 at a usable voltage. In the present example, the time T1 may be about 550 seconds. With subsequent voltage boosts, temporary power may be made available for an even longer period of time. In the present example, energy from the supercapacitor bank 18 may be made available for up to about 750 seconds.

Figure 3A:
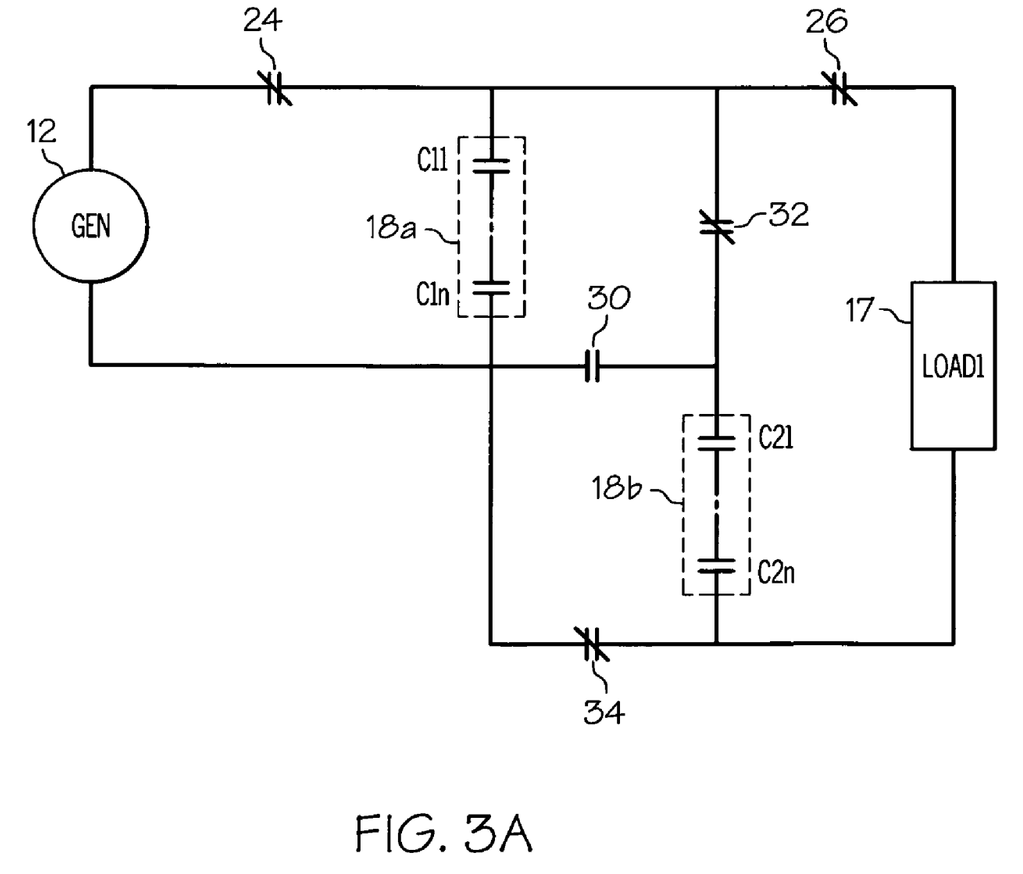
FIG. 3A is a block diagram of a temporary power system in accordance with the invention.

Referring now to FIG. 3A, a block diagram shows an inventive arrangement of elements which may be employed to produce the desirable voltage boosting described above. For simplicity, an exemplary combination of only two supercapacitors sub-banks, 18a and 18b, is shown. Prior to discharge, the sub-banks 18a and 18b may be arranged in a parallel configuration. The main contactor 24 and contactor 26 may be closed; a switch 30 may be open; a switch 32 may be closed and a switch 34 may be closed.

Figure 3B:
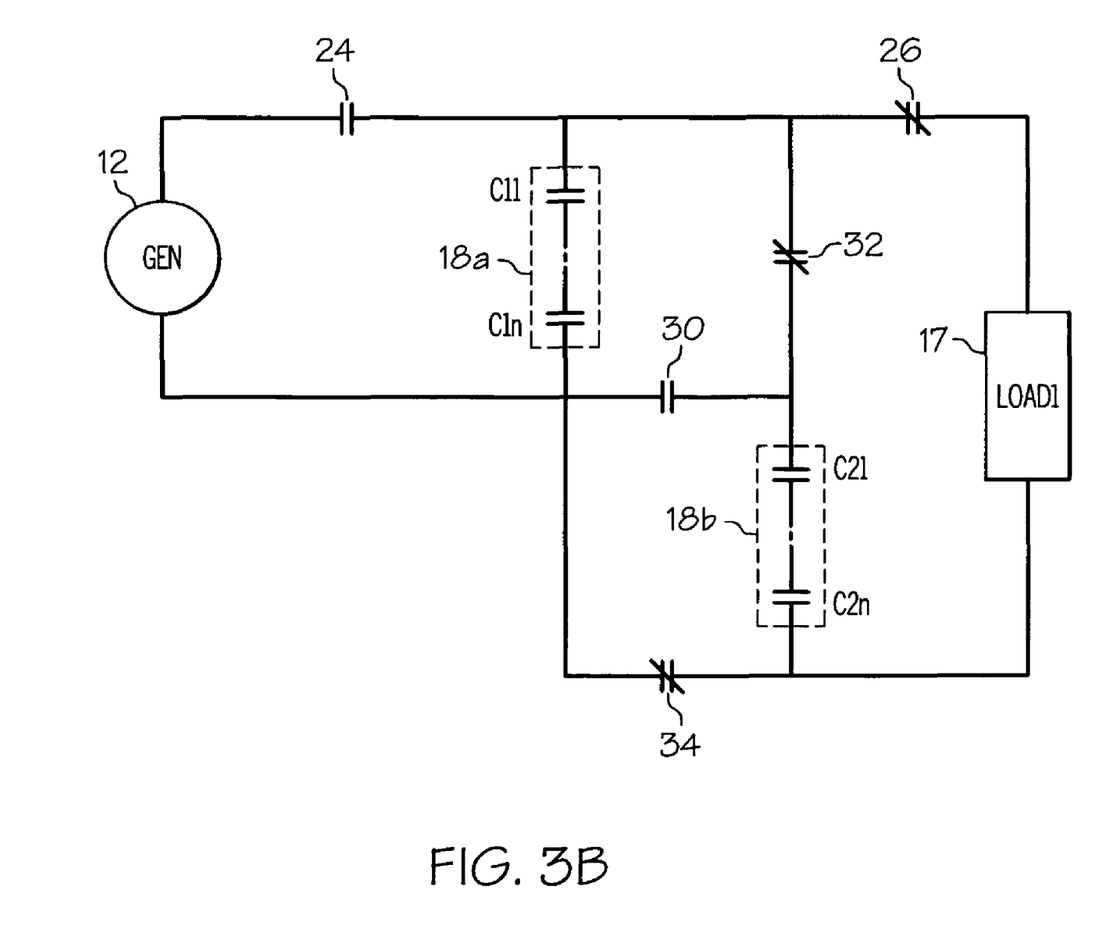
FIG. 3B is a block diagram of a temporary power system in accordance with the invention.

Referring now to FIG. 3B, it may be seen that when discharge is initiated, the main contactor 24 may be open and contactor 26 may be closed. Switch 32 may be closed and a switch 34 may be closed so that initial discharge takes place with the sub-banks 18a and 18b in parallel configuration.

Figure 3C:
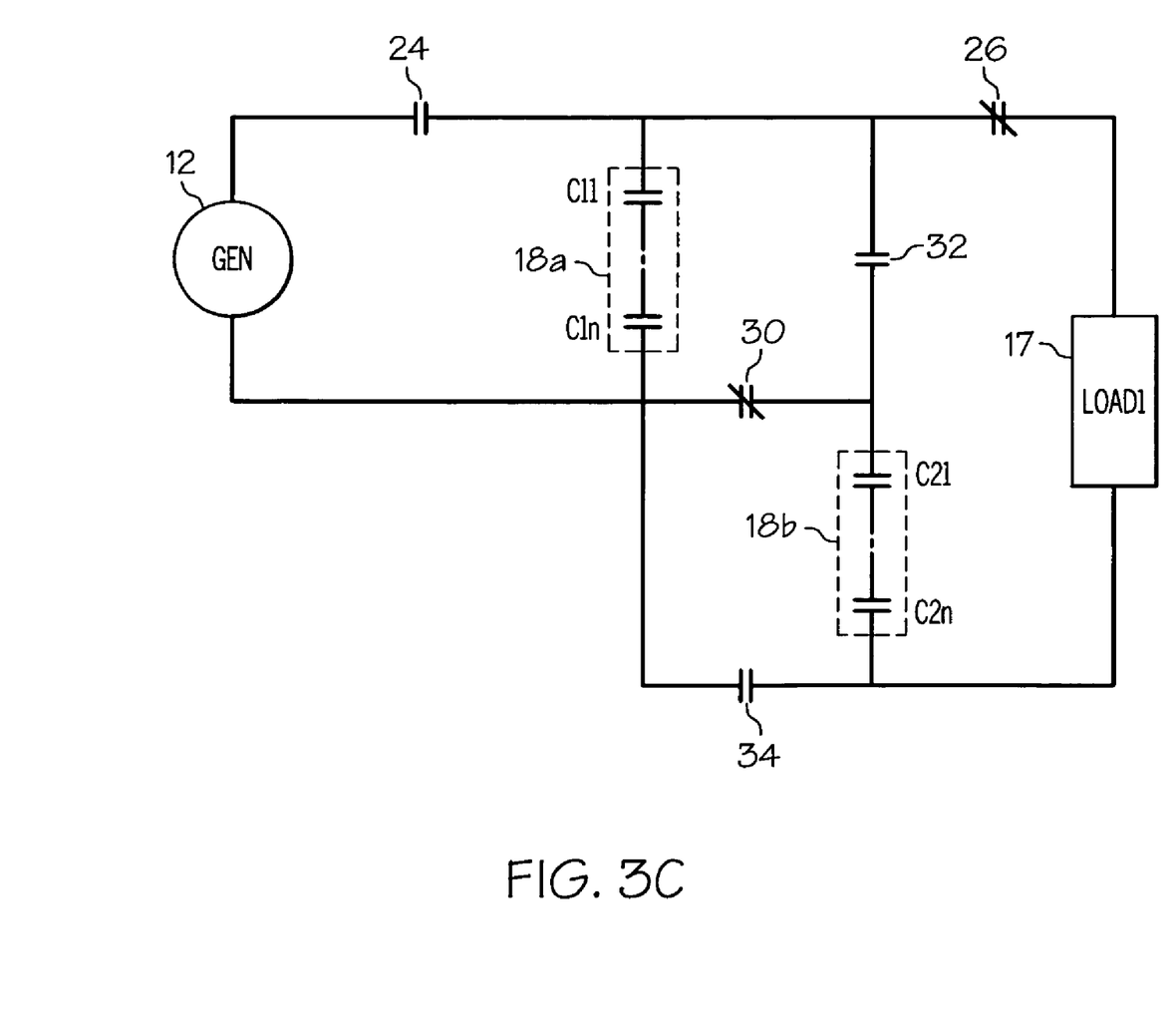
FIG. 3C is a block diagram of a temporary power system in accordance with the invention.

Referring now to FIG. 3C it may be seen that as parallel discharge of the sub-bank 18a and 18b continues and the voltage level 212 of FIG. 2 is reached, the switches 32 and 34 and the switch 30 may closed to configure the sub-banks 18a and 18b in series. Connecting the sub-banks 18a and 18b into a series combination will provide a voltage boost to the overall output voltage of the supercapacitor bank 18.

As a voltage boost is applied to the supercapacitor bank 18, more of its stored energy becomes available as usable energy. Similarly, each of the sub-banks that are added to a series combination is also a target for a voltage boost from a subsequent addition of still another one of the sub-banks to the series combination. While the series combination shown in FIG. 3C only portrays two of the sub-banks, 18a and 18b, it should be clear that any number of the sub-banks may be successively combined into series.

As each new sub-bank is added to the series combination, the previously added sub-banks may be provided with voltage boosts. It may be seen that if the supercapacitor bank 18 is comprised of a larger number of sub-banks then a greater share of the total stored energy in the supercapacitor bank 18 of FIG. 1A may be usable.

Consider, for example, one of the supercapacitor banks 18 structured as an arrangement of two sub-banks 18a and 18b. The parallel configuration of the sub-banks 18a and 18b may deliver about 60% of their energy as usable energy. Because of a voltage boost provided by series connection of sub-banks 18a and 18b an additional 35% of their energy may be delivered to the bus 16. In other words, the parallel to series switching of the sub-banks 18a and 18b may deliver about 85% of their stored energy at a usable voltage as compared to about 61% when such switching is not performed.

It may be noted by referring back to FIG. 2 that the above described technique for voltage boosting may provide for an additional benefit of extending a time over which temporary power may be provided. In the example of FIG. 2, the voltage level 212 may be first reached in about 550 sec. Switching of the second sub-bank into a series connection with the first bank may extend the time during which usable temporary power may be provided. As successive sub-banks are added to the series, the time period is further extended.

It may also be noted that the contactors 24, 26 and 36 and the switches 30, 32 and 34 may be operated with programmed control signals that may be produced by a microprocessor or digital signal processor in the GCU 14. Consequently, it may be seen that there is no need to provide dedicated current-limiting devices or voltage boosting devices for the power distribution system 10 as described.

Figure 4:
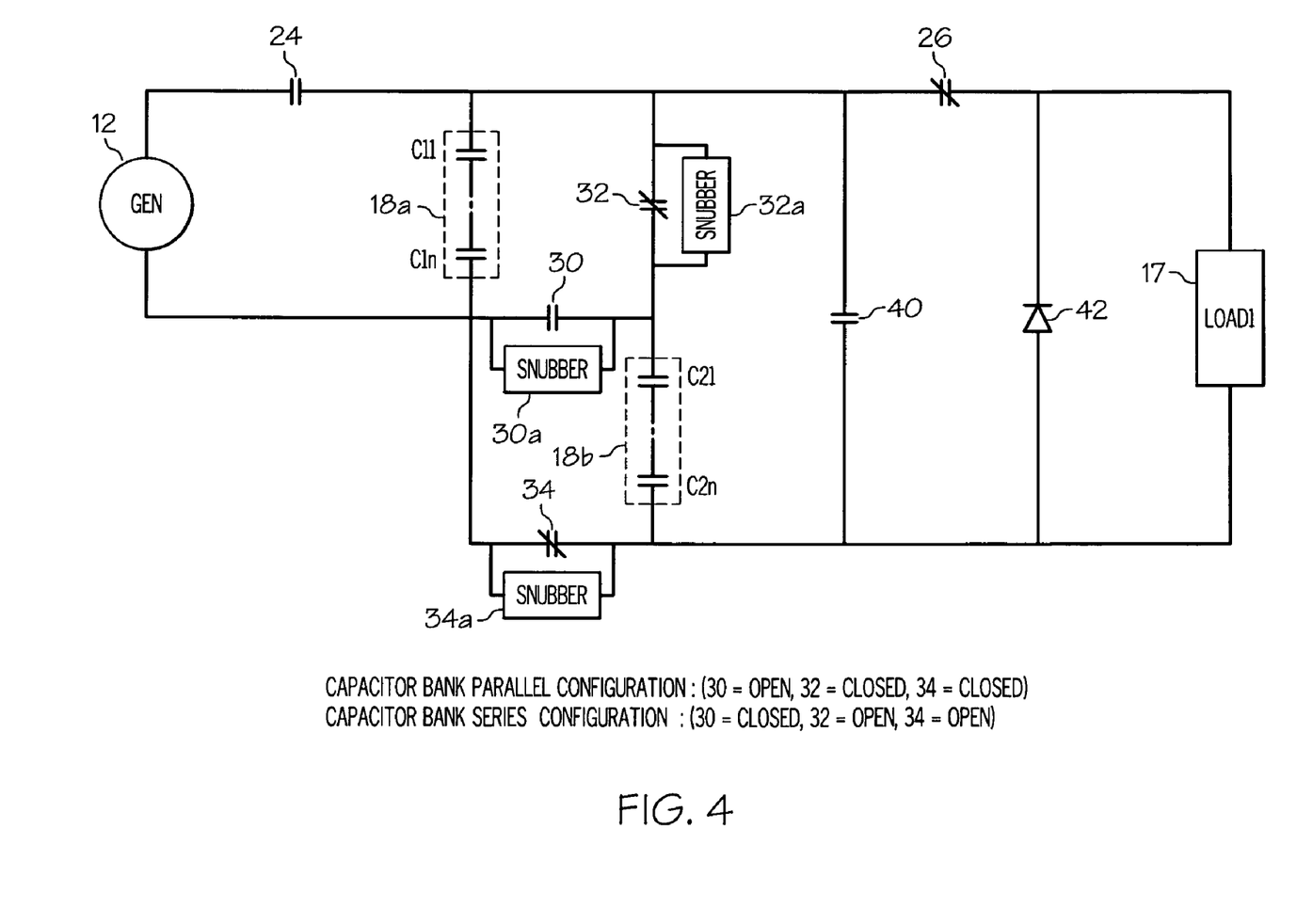
FIG. 4 is a block diagram of alternate embodiment of a temporary power system in accordance with the invention.

Referring now to FIG. 4, another embodiment of the present invention is illustrated. In FIG. 4, each of the switches 30, 32 and 34 may be provided with snubbers 30a, 32a and 34a respectively. A hold-up capacitor 40 and a freewheeling diode 42 may be inserted in parallel with the load 17. During switching of the sub-bank 18b into a series combination with the sub-bank 18a, the switches 32 and 34 may be opened before closing switch 30. Load current may be maintained through the freewheeling diode 42 and the load voltage may be maintained by the hold-up capacitor 40. In this manner, risk of excessive currents during switching is reduced and continuity of temporary power may be maintained. This method of switching is referred to as 'No-Break-Power-Transfer', since there is no interruption of current flow to the load during transients.

Figure 5:
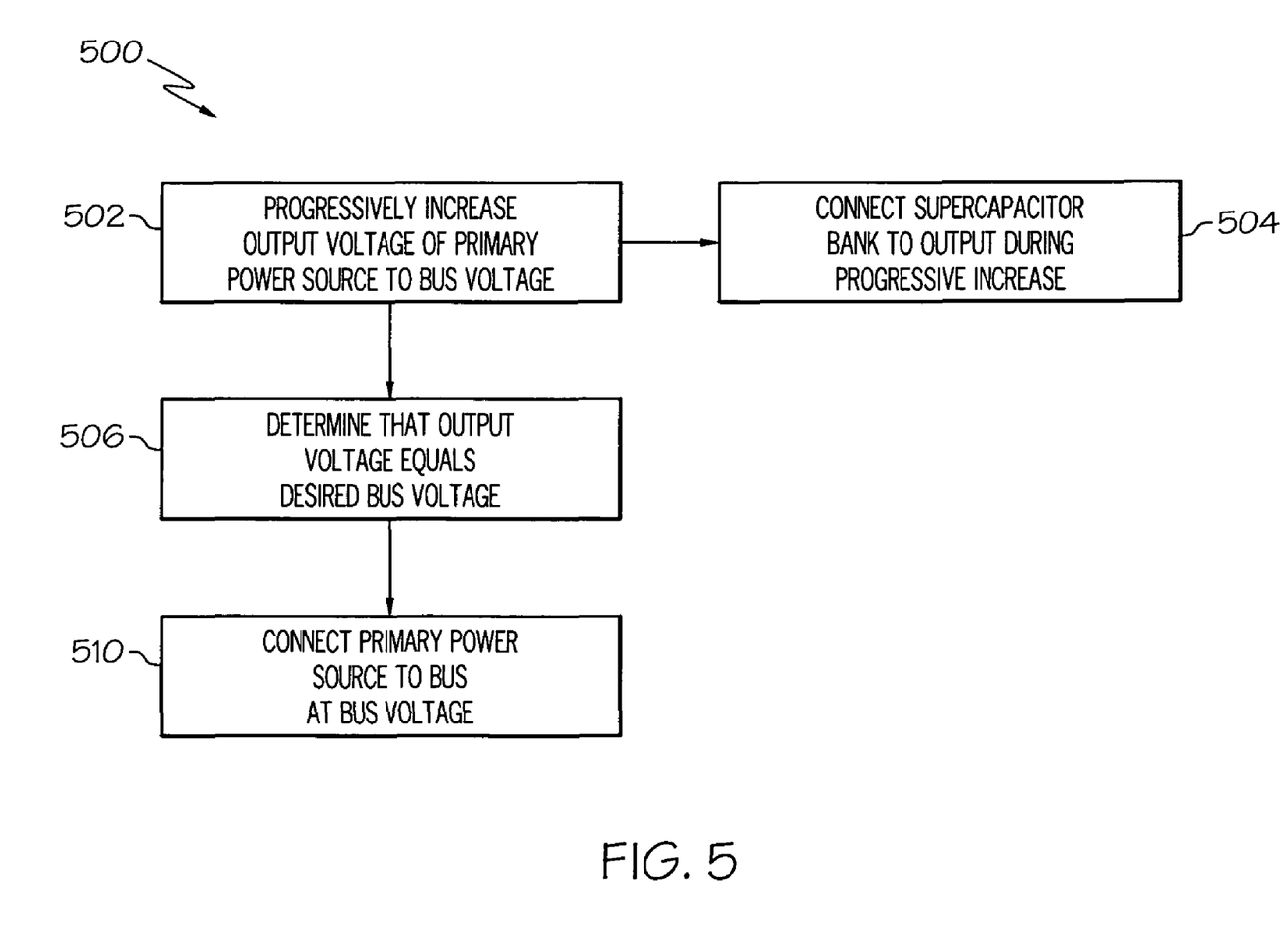
FIG. 5 is a flow chart of a method for charging supercapacitors to provide temporary power in accordance with the present invention.

In one embodiment of the present invention, a method 500 may be provided for charging supercapacitors (e.g. the supercapacitor bank 18) to provide temporary power to a power distribution system (e.g. the power distribution system 10). FIG. 5 illustrates, in block form, a method 500 for providing such charging. In a step 502, output voltage of a primary power source (e.g. the generator 12) may be progressively increased up to a desired bus voltage (e.g. for the bus 16). In a step 504, a supercapacitor bank may be connected to an output (e.g. the output 12a) of the primary power source while the progressive voltage increase of step 502 is taking place. In a step 506, a determination may be made that the output voltage has reached the desired bus voltage. After the desired bus voltage is reached the primary power source may be connected to the bus.

Figure 6:
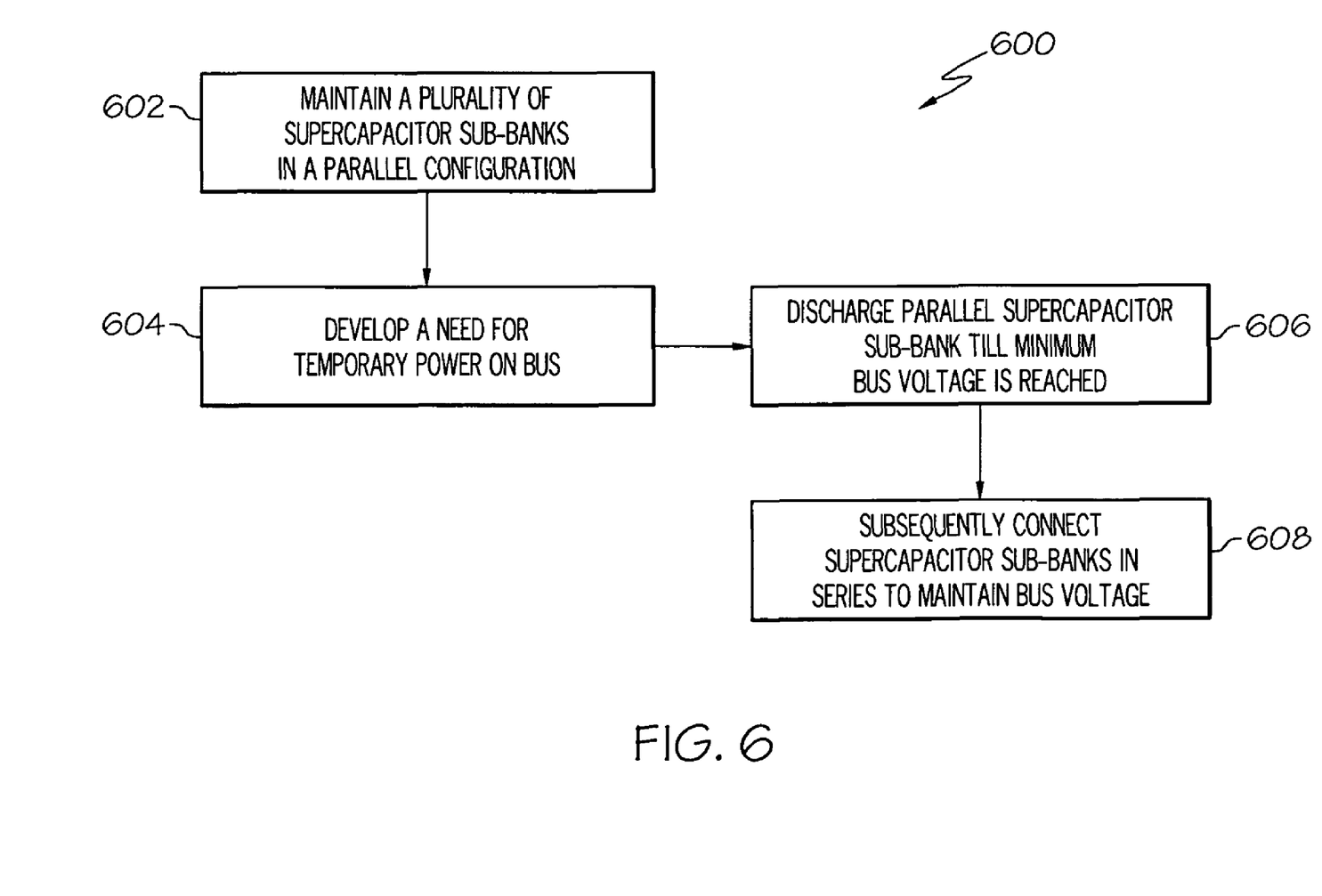
FIG. 6 is a flow chart of a method for providing temporary power by discharging supercapacitors in accordance with the present invention.

In another embodiment of the present invention, a method 600 may be provided for discharging supercapacitors (e.g. the supercapacitor bank 18) to provide temporary power to a power distribution system (e.g. the power distribution system 10). FIG. 6 illustrates, in block form, a method 600 for providing such discharging. In a step 602 a plurality of supercapacitor sub-banks (e.g. the sub-banks 18a-18n) may be maintained in an electrically parallel configuration. In a step 604, a need for temporary bus power may develop (e.g. voltage in the bus 16 may fall below the voltage at which the supercapacitor bank 18 is charged). In a step 606, the supercapacitor-bank may be discharged until a minimum usable output voltage of the supercapacitor-bank is reached. After the minimum voltage is reached, a step 608 may be initiated. In the step 608 the sub-banks (e.g. the sub-bank 18a and 18b) may be connected in series to boost the discharge voltage of the supercapacitors and maintain the bus voltage at a desired level.

Additional steps, similar to the steps 606 and 608, may be sequentially performed and repeated for n sub-banks so that the bus voltage is maintained within at a usable level. In other words, the method 600 may be practiced with an indefinite number of the sub-banks and with each added series sub-bank providing a voltage boost to a previously added sub-bank.

While the methods 500 and 600 are described separately herein, it should be noted that both the charging method 500 and the discharging method 600 may be combined to provide an overall method for providing temporary power for a power distribution system.

It should be understood, of course, that the foregoing relates to exemplary embodiments of the invention and that modifications may be made without departing from the spirit and scope of the invention as set forth in the following claims.

We claim:

1. A method for storing temporary power for a power distribution system comprising the steps of:
    progressively increasing an output voltage of a power source from zero volts to a desired bus voltage during startup prior to connecting the power source to a bus of the system;
    connecting a supercapacitor to the power source during the startup of the power source;
    progressively charging the supercapacitor with current from the power source at the increasing voltage while maintaining the supercapacitor disconnected from the bus;
    connecting the power source to the bus after the output voltage reaches the desired bus voltage; and
    connecting the supercapacitor to the bus after the desired bus voltage is reached at the output of the power source whereby the supercapacitor receives charging current from the power source at the progressively increasing voltage and the supercapacitor is progressively charged without a dedicated charge-current-limiting device.

2. The method of claim 1 wherein a plurality of the supercapacitors are charged.

3. The method of claim 2 wherein the supercapacitors are charged while being interconnected in parallel with each other.

4. The method of claim 2 comprising the further steps of:
    maintaining charge in the supercapacitors by interconnecting the supercapacitors in parallel to form a supercapacitor bank; and
    connecting the supercapacitor bank to the bus.

5. The method of claim 2 comprising the further step of:
    combining the supercapacitors into a plurality of supercapacitor sub-banks interconnected to each other in a parallel configuration.

6. The method of claim 5 comprising the further steps of:
    disconnecting a first one of the sub-banks from the parallel configuration; and
    connecting the first sub-bank in series with a second one of the sub-banks that remains in the parallel configuration to produce a boost of bus voltage.

7. The method of claim 6 comprising the further steps of:
    successively disconnecting sub-banks from the parallel configuration; and
    successively connecting the sub-banks in series with the sub-banks that remain in the parallel configuration to produce successive boosts of bus voltage.

8. The method of claim 6 wherein the step of connecting the first and second sub-banks in series is performed only after an internal voltage of the first sub-bank is reduced to a minimum usable voltage.

9. A method for providing temporary power to a power distribution bus comprising the steps of:
    connecting a supercapacitor bank to a main power source of the bus during startup of the main power source;
    progressively providing dischargeable energy in the supercapacitor bank with electrical energy from the main power source of the bus during a start-up of the main power source while maintaining the supercapacitor disconnected from the bus and while output voltage of the main power source is increasing to a desired bus voltage whereby the supercapacitor bank is charged at a progressively increasing voltage without a need for current-limiting;
    maintaining a plurality of supercapacitor sub-banks of a supercapacitor bank connected to a bus in a parallel configuration during steady-state operation of the bus and during an initial portion of a supercapacitor-discharging state of the apparatus;
    developing a need for temporary power on the bus;
    initially discharging the parallel-connected supercapacitor bank onto the bus; and
    connecting at least one of the sub-banks to one another one of the sub-banks in series when a output discharge voltage of the supercapacitor bank diminishes to a predetermined voltage, whereby a voltage of the at least two sub-banks is combined and an output voltage of the supercapacitor bank is boosted to a voltage that equals or exceeds the predetermined voltage whereby continued discharge from the series-connected sub-banks continues at a voltage level higher than the pre-determined voltage and a time period of discharge at or above the pre-determined voltage level is extended.

10. The method of claim 9 wherein the main power source is a generator.

11. The method of claim 9 wherein:
    the temporary power is required for a predetermined time period;
    a plurality of the sub-banks are successively connected in series so that power is provided to the bus at or above the desired voltage for the predetermined time period.

12. The method of claim 11 wherein the temporary power is provided for at least 500 seconds.

13. The method of claim 9 wherein the sub-banks are connected to one another with a switching sequence in which loss of power during the switching is precluded.

14. Apparatus for supplying electrical power to electrical loads on an aerospace vehicle comprising:
    a power distribution bus operable at a bus voltage;
    a primary power source;
        which produces a startup output voltage that progressively increases from zero volts to the bus voltage during startup;
        which produces an output voltage equal to the bus voltage after startup;
        which is disconnected from the bus during startup; and
        which is connected to the bus after startup;
    at least one supercapacitor
        which is disconnected from the bus during startup of the primary power source;
        which is connected to an output of the primary power source during startup of the primary power source; and
        which is connected to the bus after startup of the primary power source whereby, the supercapacitor receives charging current from the output at the progressively increasing voltage and the supercapacitor is progressively charged without a dedicated charge-current-limiting device.

15. The apparatus of claim 14 wherein the primary power source is a generator.

16. The apparatus of claim 14 wherein:
    at least a first and a second one of the sub-banks are selectively connectable to one another in series or in parallel;

the at least first and second sub-banks being connected together in parallel during steady-state operation of the apparatus and during an initial portion of a supercapacitor-discharging state of the apparatus;

the at least first and second one of the sub-banks being connected together in series during a second portion of the supercapacitor-discharging state of the apparatus when a discharge voltage of either of the at least first and second one of the sub-banks drops to a pre-determined level whereby continued discharge from the series-connected first and second sub-banks continues at a voltage level higher than the pre-determined voltage and a time period of discharge at or above the pre-determined voltage level is extended.

* * * * *